(12) United States Patent
Fukawatase et al.

(10) Patent No.: US 8,777,257 B2
(45) Date of Patent: Jul. 15, 2014

(54) SIDE AIRBAG DEVICE FOR AN AUTOMOBILE

(75) Inventors: Osamu Fukawatase, Miyoshi (JP); Yusuke Fujiwara, Okazaki (JP)

(73) Assignee: Toyota Jidosha Kabushiki Kaisha, Toyota (JP)

(*) Notice: Subject to any disclaimer, the term of this patent is extended or adjusted under 35 U.S.C. 154(b) by 0 days.

(21) Appl. No.: 14/001,403

(22) PCT Filed: Mar. 3, 2011

(86) PCT No.: PCT/JP2011/054975
§ 371 (c)(1),
(2), (4) Date: Aug. 23, 2013

(87) PCT Pub. No.: WO2012/117561
PCT Pub. Date: Sep. 7, 2012

(65) Prior Publication Data
US 2013/0328294 A1 Dec. 12, 2013

(51) Int. Cl.
*B60R 21/2338* (2011.01)
*B60R 21/207* (2006.01)

(52) U.S. Cl.
USPC .................. 280/730.2; 280/743.1; 280/743.2

(58) Field of Classification Search
USPC .................. 280/729, 730.2, 743.1, 743.2
See application file for complete search history.

(56) References Cited

U.S. PATENT DOCUMENTS

| | | | |
|---|---|---|---|
| 7,793,977 B2 * | 9/2010 | Sato et al. | 280/743.2 |
| 2004/0124615 A1 * | 7/2004 | Tanase et al. | 280/730.2 |
| 2006/0267318 A1 * | 11/2006 | Nishikaji et al. | 280/730.2 |
| 2007/0182135 A1 | 8/2007 | Kai et al. | |
| 2007/0228701 A1 * | 10/2007 | Yamamura | 280/730.2 |
| 2008/0100045 A1 | 5/2008 | Fukawatase et al. | |
| 2008/0174093 A1 | 7/2008 | Inoue | |
| 2009/0020987 A1 | 1/2009 | Wipasuramonton et al. | |
| 2010/0140907 A1 * | 6/2010 | Shimono | 280/730.2 |
| 2010/0181749 A1 | 7/2010 | Sugimoto | |
| 2011/0079991 A1 * | 4/2011 | Ravenberg et al. | 280/740 |
| 2011/0285119 A1 | 11/2011 | Yamamoto et al. | |
| 2012/0200072 A1 * | 8/2012 | Fukawatase et al. | 280/741 |
| 2012/0256400 A1 * | 10/2012 | Shimono | 280/729 |

FOREIGN PATENT DOCUMENTS

| | | |
|---|---|---|
| JP | A-09-011842 | 1/1997 |
| JP | A-2003-182499 | 7/2003 |
| JP | A-2007-210371 | 8/2007 |
| JP | A-2008-110660 | 5/2008 |
| JP | A-2008-174137 | 7/2008 |
| JP | A-2009-023640 | 2/2009 |
| JP | A-2010-163142 | 7/2010 |
| JP | A-2010-184595 | 8/2010 |

* cited by examiner

*Primary Examiner* — Ruth Ilan
*Assistant Examiner* — Darlene P Condra
(74) *Attorney, Agent, or Firm* — Oliff PLC (57) ABSTRACT

Lifting up of a side airbag toward a vehicle upper side when there is a side collision is suppressed or prevented. In a side airbag, a tether is provided that divides the side airbag into a lower chamber and an upper chamber. The tether is attached in an attitude that, viewed from a vehicle forward side, is inclined such that a vehicle width direction inner side thereof is higher than the vehicle width direction outer side. A gas jetting aperture is formed at a lower end portion of a diffuser of a gas jetting unit. The gas jetting aperture is disposed in the lower chamber and is oriented toward a lower face of the tether. Therefore, during a process of expansion of the side airbag, gas strikes the lower face of the tether, then strikes portions that have not yet unfolded, and flows downward.

4 Claims, 9 Drawing Sheets

SIDE AIRBAG DEVICE FOR AN AUTOMOBILE

TECHNICAL FIELD

The present invention relates to a side airbag device for an automobile that expands a side airbag when there is a side collision.

BACKGROUND ART

The below-mentioned Patent Document 1 discloses a structure in which, in a side airbag device, a balancing inflation chamber is formed at a lower rearward portion of a lower inflation chamber that opposes the pelvis area of a vehicle occupant. Thus, even if a flow of gas jetted from an inflator into the lower inflation chamber is diverted upward at a forward distal end portion of a dividing wall and a force pressing upward acts on the side airbag, the balancing inflation chamber applies a force pressing downward, and an upward movement of the lower inflation chamber is suppressed. Therefore, the airbag may be inflated and expanded in a state in which the lower inflation chamber is kept stable.

Patent Document 1: Japanese Patent Application Laid-Open (JP-A) No. 2007-210371

DISCLOSURE OF INVENTION

Technical Problem

However, with the structure disclosed in the above-mentioned related art, a side portion of a seat cushion may be pushed upward by the intrusion of a side door at the time of a side collision. If this happens, the balancing inflation chamber may not be expanded downward relative to the lower inflation chamber, and it may not be possible for an upward movement of the lower inflation chamber to be adequately suppressed. Moreover, when the gas in the lower inflation chamber flows into an upper inflation chamber through a gap between a rear end of the dividing wall and the inflator, the lower inflation chamber may lift up.

In consideration of the circumstances described above, an object of the present invention is to provide a side airbag device for an automobile that may suppress or prevent a side airbag lifting up toward a vehicle upper side when there is a side collision.

Solution to Problem

A side airbag device for an automobile according to a first aspect includes: a side airbag including an occupant side base cloth portion disposed at an occupant side and a vehicle body side base cloth portion disposed at a vehicle body side portion side, the side airbag being stowed in a folded state; a tether that is disposed inside the side airbag, and of which a height of an attachment portion thereof to the vehicle body side base cloth portion is specified to be different from a height of an attachment portion thereof to the occupant side base cloth portion, the tether dividing a cavity inside the side airbag into a lower chamber and an upper chamber, the lower chamber protecting a pelvis area of an occupant, and the upper chamber being in fluid communication with the lower chamber via a communication portion and protecting at least a torso area of the occupant; and a gas jetting unit, a gas jetting aperture of which is disposed in the lower chamber, the gas jetting unit jetting gas out toward a lower face of the tether when operated.

In a side airbag device for an automobile according to a second aspect, in the first aspect, the height of the attachment portion of the tether to the vehicle body side base cloth portion is specified to be lower than the height of the attachment portion to the occupant side base cloth portion, and the height of the attachment portion of the tether to the vehicle body side base cloth portion is specified to be lower than a height of a door armrest.

In a side airbag device for an automobile according to a third aspect, in the first aspect or the second aspect, the gas jetting unit includes: an inflator that, when operated, produces gas and jets out the gas through plural gas jetting holes formed in a lower end portion thereof; and a diffuser that is formed in a tube shape of which one end is closed off, that covers the inflator, and in which one of the gas jetting aperture is provided, the gas jetting aperture being disposed to be oriented toward the lower face of the tether.

In a side airbag device for an automobile according to a fourth aspect, in any one of the first to third aspects, a gap is formed between a front end portion of a non-inflating portion provided at an outer periphery of the side airbag and a front end portion of the tether, the gap serving as the communication portion.

According to the first aspect, the height of the attachment portion at which the tether disposed inside the side airbag is attached to the vehicle body side base cloth portion and the height of the attachment portion at which the tether is attached to the occupant side base cloth portion are specified to be different. Therefore, in the expanded state as viewed from the vehicle forward side, the tether is disposed in an inclined state in the side airbag. In the present aspect, the side airbag equipped with this tether is stowed in the folded state.

When there is a side collision, the gas jetting unit operates and gas is jetted out from the gas jetting unit. The gas jetting aperture of the gas jetting unit is disposed inside the lower chamber, and the gas is jetted out toward the lower face of the tether. Consequently, during the process of unfolding of the side airbag, the gas strikes the lower face of the tether and then strikes the occupant side base cloth portion, vehicle body side base cloth portion and tether that have not yet unfolded, and the flow is changed to a direction toward the vehicle lower side. Thus, the side airbag inflates and expands starting from the lower chamber that protects the pelvis area of the occupant, and thereafter, via the communication portion, the upper chamber that protects at least the torso area of the occupant is inflated and expanded.

Now, if a vehicle body side portion intrudes into the vehicle cabin when there is a side collision, a side portion of a seat cushion of a vehicle seat at the vehicle width direction outer side thereof may be pushed up by this vehicle body side portion. If this happens, the side airbag acts to move toward the vehicle upper side (acts to lift up). Furthermore, depending on how the gas flows in the side airbag, the side airbag acts to lift up when the gas is flowing from the lower chamber into the upper chamber. In the present aspect, however, while the side airbag is expanding, the gas inflates the lower chamber while flowing with the direction of flow being diverted toward the vehicle lower side. Therefore, a force that pushes the side airbag down toward the vehicle lower side is provided.

According to the second aspect, the height of the attachment portion of the tether to the vehicle body side base cloth portion is specified to be lower than the height of the attachment portion to the occupant side base cloth portion. Therefore, the tether is disposed in the form of an inclined surface of which the side closer to the occupant is higher than the side closer to the vehicle body side portion. Therefore, a contact area between the lower chamber, which has a high internal pressure, and the thigh area of the occupant is larger than in a case in which the direction of inclination is the opposite direction.

In addition, the height of the attachment portion of the tether to the vehicle body side base cloth portion is specified to be lower than the height of the door armrest. Therefore, if a vehicle body side portion intrudes to the vehicle cabin interior side when there is a side collision, strong contact between the armrest and the lower chamber with the high internal pressure may be suppressed or avoided.

According to the third aspect, a plural number of the gas jetting holes are formed in the lower end portion of the inflator. Therefore, the gas is jetted out from the respective gas jetting holes. The inflator is covered with the diffuser, and the gas jetting aperture of the diffuser is singly formed and disposed in the orientation toward the lower face of the tether. Therefore, the gas that is jetted out from each of the plural gas jetting holes of the inflator is jetted out from the single gas jetting aperture of the diffuser, and is jetted out toward the lower face of the tether.

According to the fourth aspect, the gas that is jetted into the lower chamber flows into the upper chamber through a gap that is disposed at the vehicle forward side relative to the middle of the pelvis area of the occupant (more specifically, the gap between the front end portion of the non-inflating portion provided at the outer periphery of the side airbag and the front end portion of the tether). Consequently, unevenness of the lower chamber of the side airbag may be suppressed.

Advantageous Effects of Invention

As described hereabove, the automobile side airbag device according to the first aspect has an excellent effect in that lifting up of the side airbag toward the vehicle upper side when there is a side collision may be suppressed or prevented.

The automobile side airbag device according to the second aspect has excellent effects in that occupant pelvis area restraint performance may be improved, and a load on the pelvis area of an occupant that is caused by an armrest strongly pressing the lower chamber with the higher internal pressure may be moderated or eliminated.

The automobile side airbag device according to the third aspect has an excellent effect in that the downward pushing force of the side airbag may be adjusted by adjustment of the opening area and shape of the gas jetting aperture of the diffuser, the orientation of the gas jetting aperture relative to the lower face of the tether, and the like.

The automobile side airbag device according to the fourth aspect has an excellent effect in that the side airbag may be expanded in a consistent attitude.

BEST MODE FOR CARRYING OUT THE INVENTION

Herebelow, an exemplary embodiment of the side airbag device for an automobile according to a present mode is described using FIG. 1 to FIG. 9. An arrow FR that is shown as appropriate in these drawings indicates a vehicle forward side, an arrow UP indicates a vehicle upward side, and an arrow IN indicates a vehicle width direction inner side.

Figure 1:
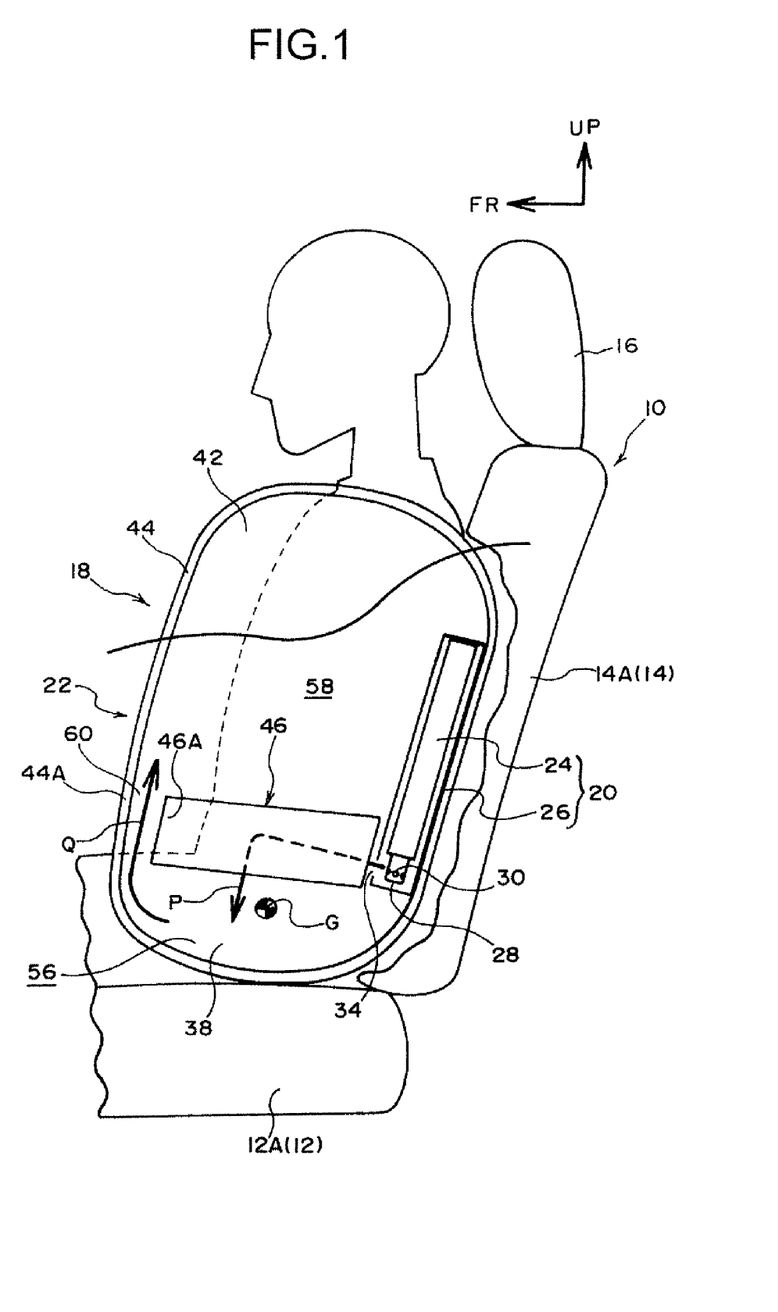
FIG. 1 is a side view showing an automobile side airbag device in accordance with an exemplary embodiment, in an expanded state of a side airbag.
Figure 2:
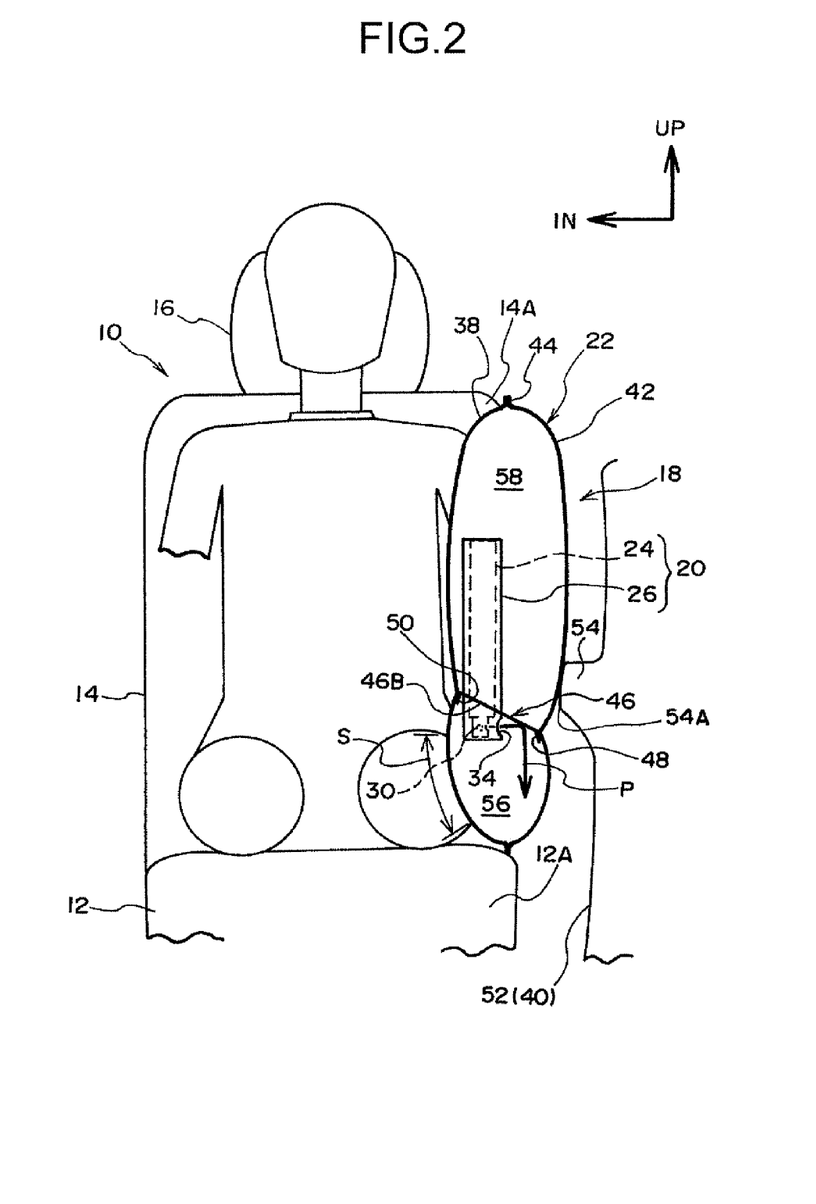
FIG. 2 is a front view, viewed from the vehicle forward side, showing the automobile side airbag device that is shown in FIG. 1.

As shown in FIG. 1 and FIG. 2, a front seat 10 of a vehicle is a structure that includes a seat cushion 12, a seatback 14 and a headrest 16. An occupant sits on the seat cushion 12. The seatback 14 is provided standing tiltably from a rear end portion of the seat cushion 12 and is used as a backrest for the occupant. The headrest 16 is supported at an upper end portion of the seatback 14 to be adjustable in height.

A side airbag device 18 is provided inside a side portion 14A at a vehicle width direction outer side of the seatback 14. The side airbag device 18 is provided with a module case, which is not shown in the drawings, that opens to the vehicle forward side. A gas jetting unit 20 and a folded side airbag 22 are stowed in the module case.

Figure 3:
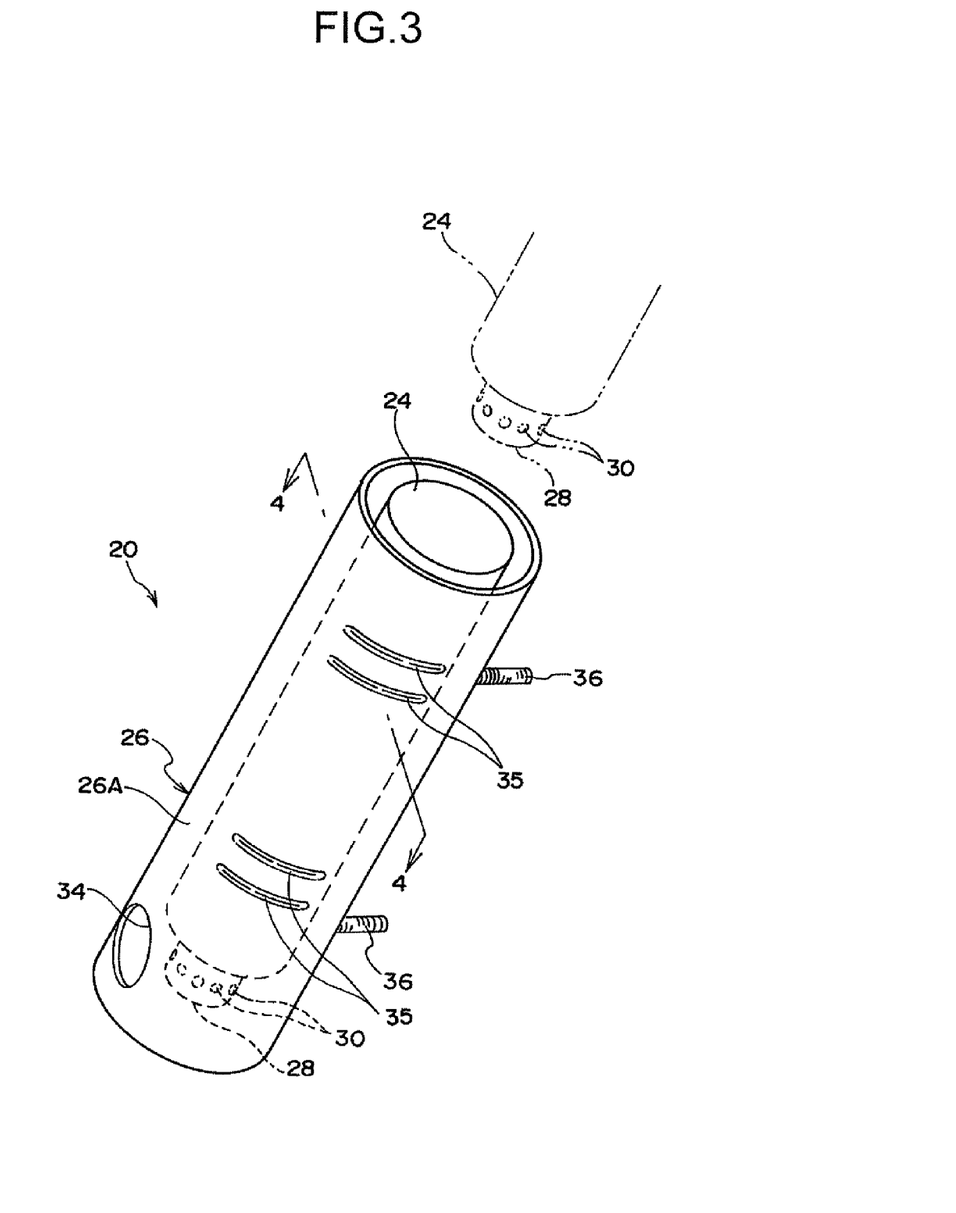
FIG. 3 is a magnified perspective view showing a magnification of a gas jetting unit that is shown in FIG. 1.
Figure 4:
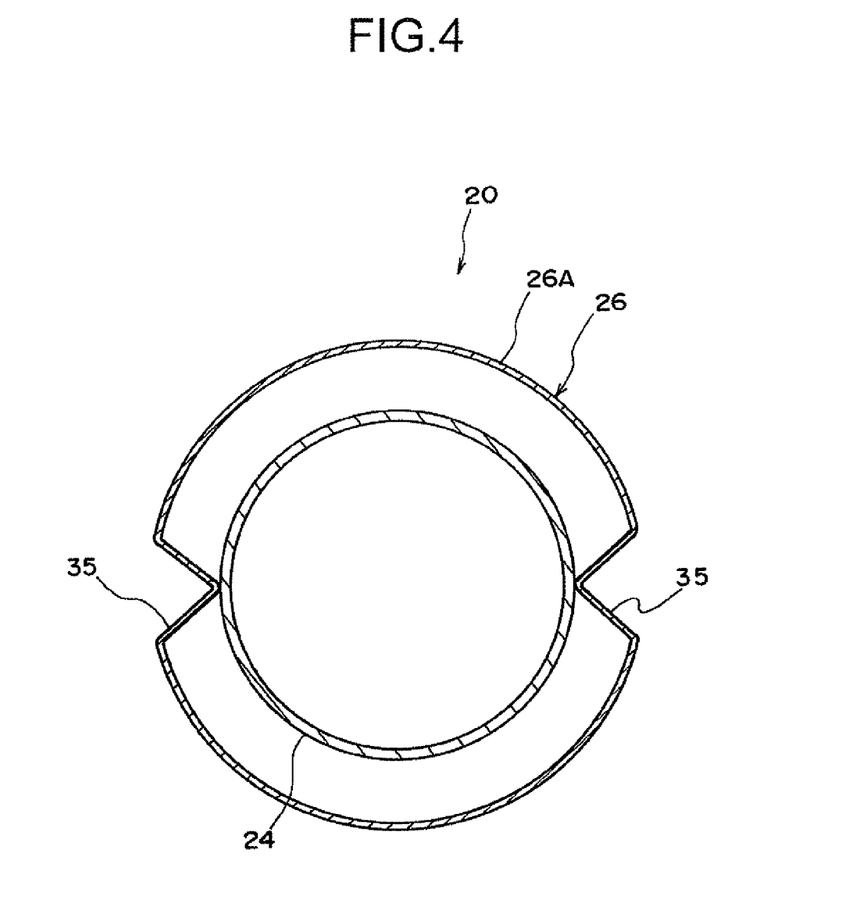
FIG. 4 is a magnified lateral sectional view taken along line 4-4 in FIG. 3.

As shown in FIG. 3 and FIG. 4, the gas jetting unit 20 is provided with an inflator 24 made of metal, which is formed in a circular rod shape, and a diffuser 26 made of metal, which is formed in the shape of a circular tube of which one end is closed off. A protruding portion 28 is coaxially formed at one axial direction end portion of the inflator 24, in the shape of a circular tube of which one end is closed off, with a smaller diameter than the inflator 24. A plural number of gas jetting holes 30 are formed with predetermined spacings in a periphery wall portion of the protruding portion 28. A squib is disposed at an axial center portion of the other axial direction end portion of the inflator 24, and is connected to a connector, which is not shown in the drawings. The interior of the inflator 24 is charged with an ignition agent that ignites when the squib is electrified, an inflammation agent that propagates a flame in a gas production agent, which is described below, and a large amount of gas production agent that produces a large volume of gas by combusting. In addition, the interior of the inflator 24 incorporates functional elements such as a coolant that functions as a cooling material for cooling the gas, a filter that works to remove fragments that are produced when the gas production agent combusts, and the like. An inflator of a high-pressure gas enclosing type may be used instead of the above-described inflator 24 of a gas-producing agent enclosing type.

The squib of the inflator 24 with the structure described above is electrified by an airbag electronic control unit (ECU) when a side collision detection sensor, which is not shown in the drawings, disposed at a vehicle body side portion such as a lower portion of a center pillar or the like detects that a side collision is happening or a rollover protection sensor, which is not shown in the drawings, disposed below a center console or the like detects that a rollover is happening.

A periphery wall 26A of the diffuser 26 is formed in a circular tube shape of a size into which the inflator 24 can be inserted. A single, circular gas jetting aperture 34 with a predetermined opening area is formed at one axial direction end portion side of the periphery wall 26A of the diffuser 26. The inflator 24 is inserted into the diffuser 26 such that the protruding portion 28 of the inflator 24 is disposed at the gas jetting aperture 34 side of the diffuser 26. In this state, a plural number of axial direction locations of the periphery wall 26A are crimped. Thus, the inflator 24 is fixed to the diffuser 26 in the state in which the inflator 24 is inserted into the diffuser 26. The crimped portions are illustrated in FIG. 3 and FIG. 4 as crimped portions 35. A pair of stud bolts 36, which are separated by a predetermined distance in the axial direction of the diffuser 26, are provided standing from the periphery wall 26A of the diffuser 26 toward the radial direction outer side.

The gas jetting unit 20 with the structure described above is inserted into the interior of the side airbag 22, which is in the folded state, and the pair of stud bolts 36 penetrates through the side airbag 22 and a floor wall of the module case. The penetrating end portions of the stud bolts 36 are fastened and fixed by nuts to a side frame that is provided at the inner side of the side portion 14A at the vehicle width direction outer side of the seatback 14.

As shown in FIG. 1 and FIG. 2, the side airbag 22 includes an occupant side base cloth portion 38, which is disposed at the occupant side when the side airbag 22 is completely inflated and expanded, and a vehicle body side base cloth portion 42, which is disposed at the side of a side door 40, which is a vehicle body side portion. The side airbag 22 may be fabricated of a single base cloth, and may be fabricated by two base cloths sewn together. In the former case, the base cloth is cut into a shape that expands into both the occupant side base cloth portion 38 and the vehicle body side base cloth portion 42 and is fabricated into a bag shape by outer periphery portions, apart from a fold portion, being sewn together. In the latter case, the occupant side base cloth portion 38 and the vehicle body side base cloth portion 42 are cut separately, after which the occupant side base cloth portion 38 and the vehicle body side base cloth portion 42 are superposed and fabricated into a bag shape by outer periphery portions being sewn together. In the present specification herebelow, outer periphery portions that are disposed at outer sides relative to sewing lines of the side airbag 22 are referred to as a non-inflating portion 44.

A tether 46 is provided in the vicinity of a height direction middle portion of the interior of the side airbag 22. The tether 46 is fabricated by a material with the same properties as the side airbag 22 being cut to a rectangular shape. The tether 46 is disposed inside the side airbag 22 such that the long sides of the tether 46 are oriented to the vehicle front-and-rear direction. As shown in FIG. 2, a vehicle width direction inner side end portion of the tether 46 is attached to the occupant side base cloth portion 38 by sewing, and a vehicle width direction outer side end portion of the tether 46 is attached to the vehicle body side base cloth portion 42 by sewing. In the present specification herebelow, the portion of the tether 46 that is sewn to the vehicle body side base cloth portion 42 is referred to as an attachment portion 48 to the vehicle body side base cloth portion 42, and the portion of the tether 46 that is sewn to the occupant side base cloth portion 38 is referred to as an attachment portion 50 to the occupant side base cloth portion 38.

In the present mode, the height of the attachment portion 48 and the height of the attachment portion 50 are specified to be different. Specifically, the height of the attachment portion 48 to the vehicle body side base cloth portion 42 is specified to be lower than the height of the attachment portion 50 to the occupant side base cloth portion 38. Therefore, the tether 46 is disposed as an inclined surface that is higher at the side closer to the occupant than at the side closer to the side door 40. Furthermore, the tether 46 as a whole is specified to be lower than the height of an upper face of an armrest 54 that is integrally formed at a door trim 52 of the side door 40. However, it is sufficient if at least the height of the attachment portion 48 of the tether 46 to the vehicle body side base cloth portion 42 is lower than a height up to a portion of the armrest 54 that protrudes furthest to the vehicle cabin inner side (which is a lower end portion 54A in the present mode).

The cavity inside the side airbag 22 is divided into a lower chamber 56 and an upper chamber 58 by the provision of the tether 46. The lower chamber 56 protects the pelvis area of the occupant, and the upper chamber 58 protects the torso area of the occupant. In other words, the tether 46 is a member that functions as a dividing member for dividing the interior of the side airbag 22 into the upper chamber 58 and the lower chamber 56. As shown in FIG. 1, a gap is formed between a front end portion 44A of the non-inflating portion 44 provided at the outer periphery of the side airbag 22 and a front end portion 46A of the tether 46. This gap serves as a communication portion 60 that communicates between the lower chamber 56 and the upper chamber 58.

Describing a positional relationship between the tether 46 and the gas jetting unit 20, as shown in FIG. 1 and FIG. 2, the gas jetting aperture 34 of the diffuser 26 of the gas jetting unit 20 is disposed inside the lower chamber 56, and the gas jetting aperture 34 is oriented toward a lower face 46B side of the tether 46.

The side airbag 22 with the structure described above is folded by bellows folding and stowed in the module case. However, the side airbag 22 does not necessarily have to be folded by bellows folding but may be folded by roll folding, and may be folded by a combination of bellows folding and roll folding.

An aperture portion of the module case is covered with a seatback pad, which is not shown in the drawings, provided inside the seatback 14. When the side airbag 22 is expanding, a sewn portion of a cover covering the surface of the seatback pad is split and opens up.

Now, operations and effects of the present exemplary embodiment are described.

When there is a side collision, first, a side collision condition is detected by a side collision sensor, which is not shown in the drawings, and a signal is inputted to the airbag ECU. On the basis of input signals, the airbag ECU makes a determination as to whether the side airbag device 18 should be operated. If the airbag ECU determines that the side airbag should be operated, a predetermined current is passed through the squib of the inflator 24 of the gas jetting unit 20. As a result, the ignition agent ignites, a flame is propagated in the gas production agent by the inflammation agent, and the gas production agent combusts. Thus, a large amount of gas is produced, and the gas is jetted out from the gas jetting holes 30 of the inflator 24. The gas that is jetted out from the gas jetting holes 30 of the inflator 24 is flow-regulated by the diffuser 26, and is then jetted out from the gas jetting aperture 34 into the side airbag 22 that is in the folded state.

Figure 5:
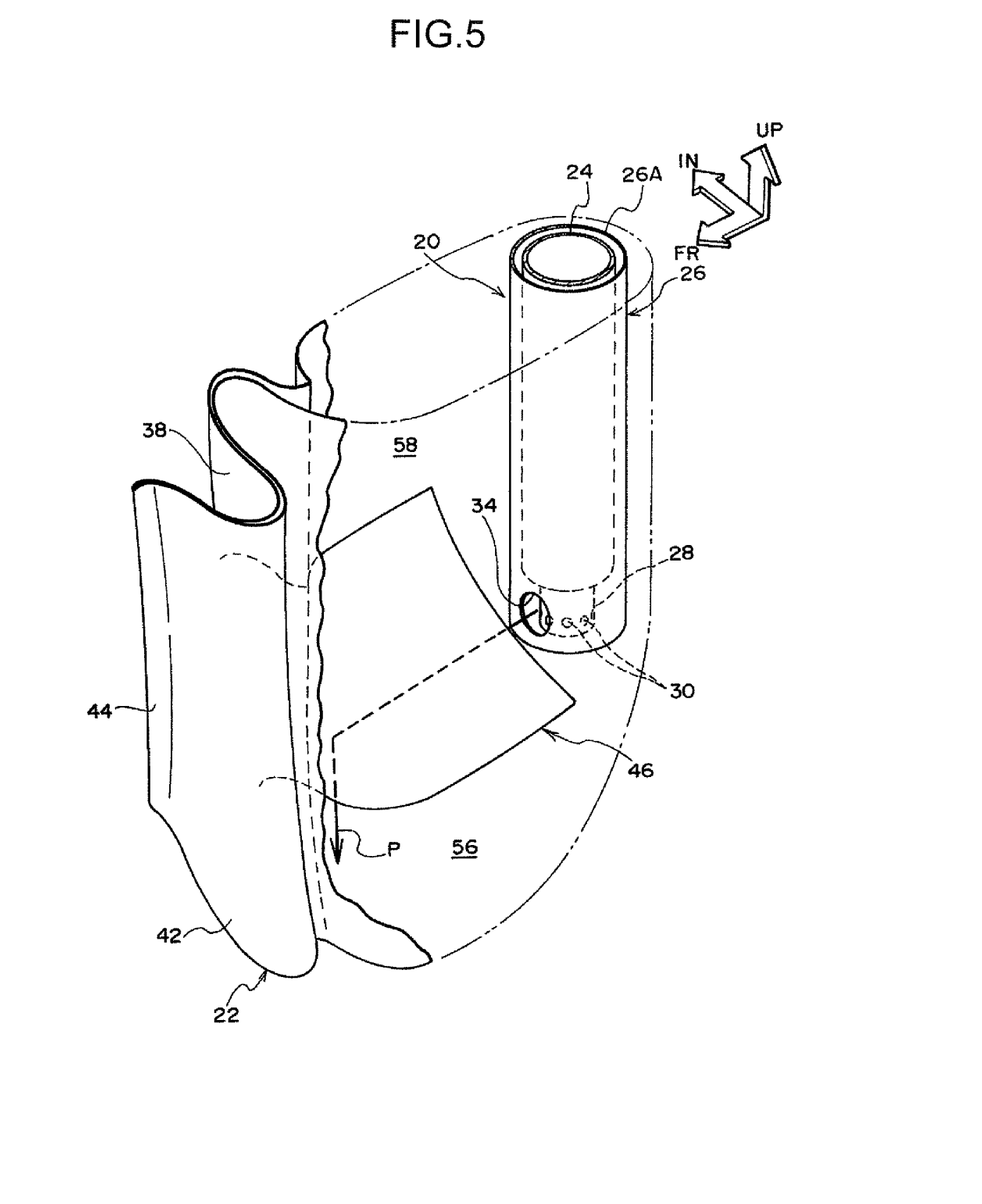
FIG. 5 is a magnified perspective view showing a state during expansion of the side airbag, cut horizontally.
Figure 6A:
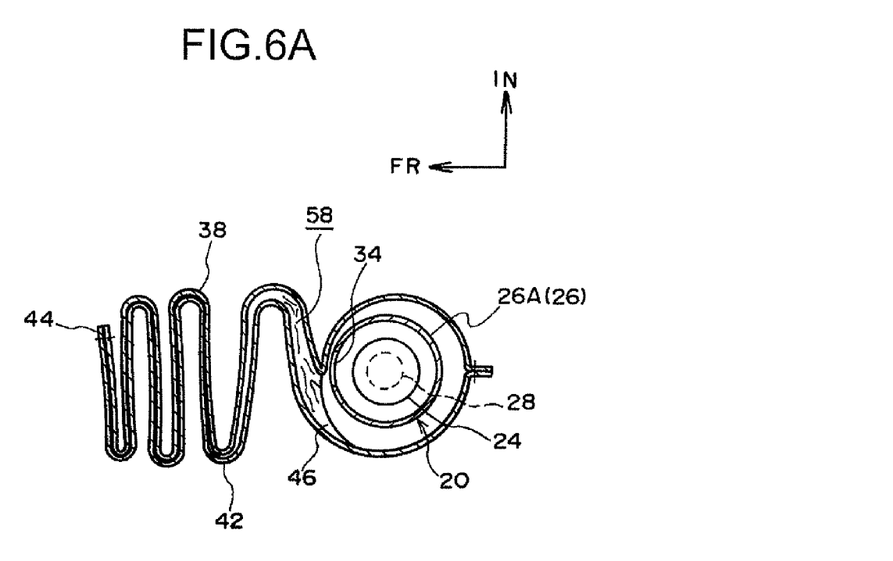
FIG. 6A is a plan sectional view showing a state at an initial period of the expansion of the side airbag.
Figure 6B:
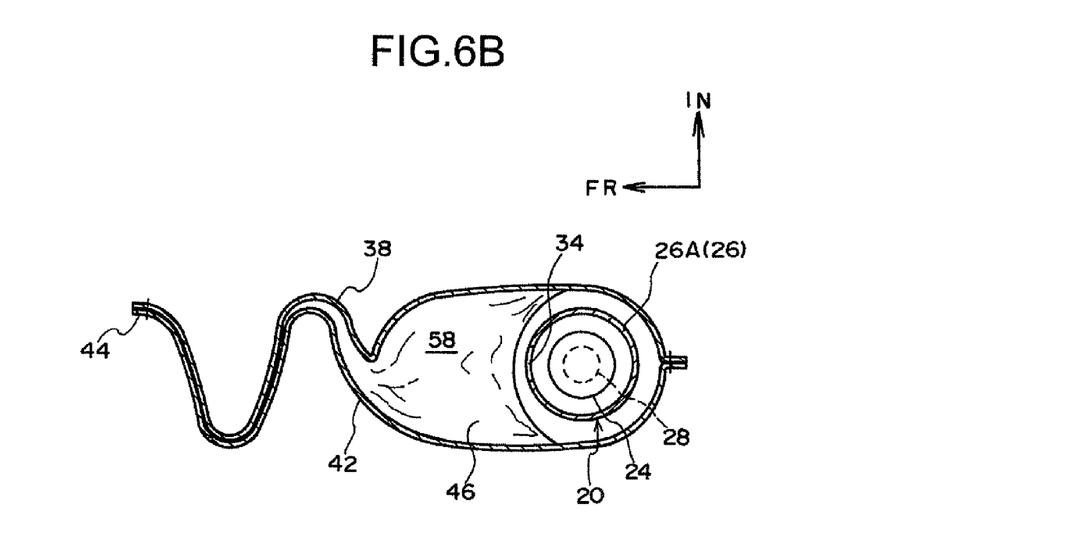
FIG. 6B is a plan sectional view showing a state at a middle period of the expansion of the side airbag.

Here, the height of the attachment portion 48 of the tether 46 disposed in the side airbag 22 to the vehicle body side base cloth portion 42 is specified to be different from the height of the attachment portion 50 to the occupant side base cloth portion 38. Therefore, viewed from the vehicle forward side, the tether 46 is disposed in a state of being inclined inside the side airbag 22 in the expanded state. In the present exemplary embodiment, the side airbag 22 equipped with this tether 46 is stowed in the folded state. Further, in the present exemplary embodiment the gas jetting aperture 34 of the diffuser 26 is disposed in the lower chamber 56 such that the gas is jetted out toward the lower face 46B of the tether 46. Therefore, as shown in FIG. 5, FIG. 6A and FIG. 6B, during the unfolding of the side airbag 22, the gas strikes the lower face 46B of the tether 46, then strikes the occupant side base cloth portion 38, the vehicle body side base cloth portion 42 and the tether 46 that have not yet unfolded, and the direction of flow is diverted toward the vehicle lower side. The flow of the gas at this time is represented by the arrow P in FIG. 1, FIG. 2 and FIG. 5.

Thus, the side airbag 22 inflates and expands, starting from the lower chamber 56 that protects the pelvis area of the occupant, after which the gas flows through the communication portion 60 from below to above, and flows into the upper chamber 58. This flow of the gas is represented by the arrow Q in FIG. 1. Then the upper chamber 58 that protects the torso area of the occupant is inflated and expanded. Hence, the pelvis area and the torso area of the occupant are protected by the side airbag 22.

Now, if the side door 40 intrudes into the vehicle cabin when there is a side collision, a side portion 12A at the vehicle width direction outer side of the seat cushion 12 of the front seat 10 may be pushed up by the side door 40. If this happens, the side airbag 22 acts to move toward the vehicle upper side (acts to lift up).

Figure 7:
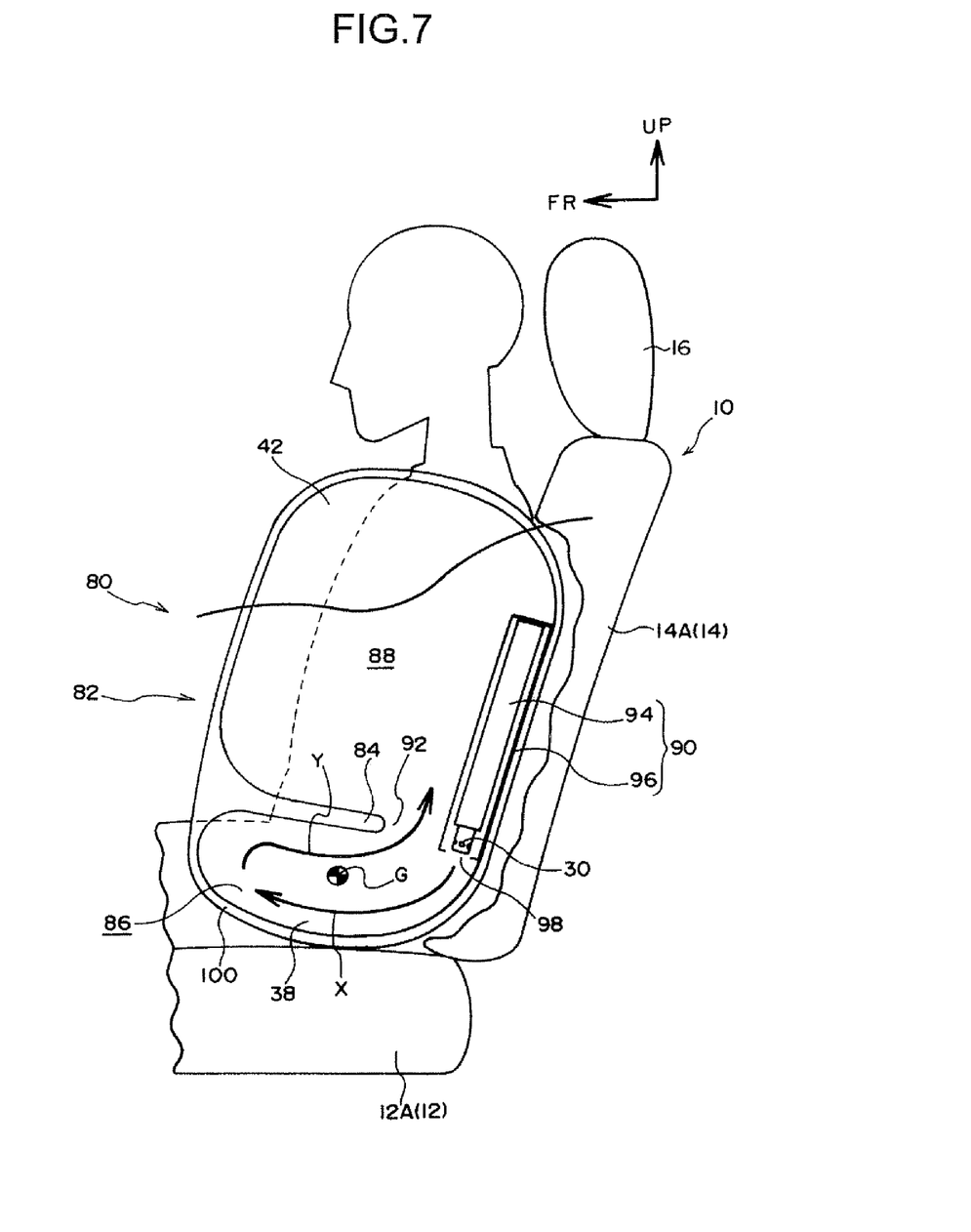
FIG. 7 is a side view showing an automobile side airbag device in accordance with a comparative example, in an expanded state of a side airbag.
Figure 8:
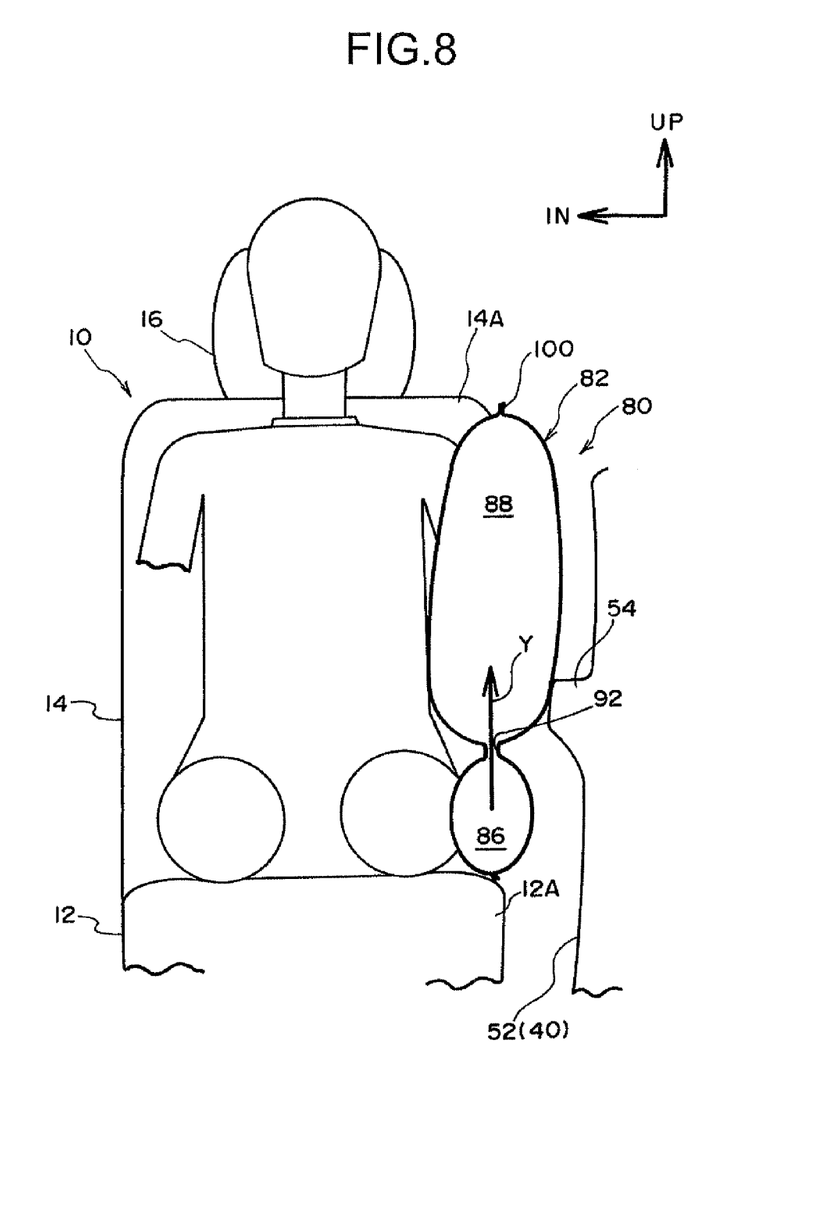
FIG. 8 is a front view, viewed from the vehicle forward side, showing the automobile side airbag device that is shown in FIG. 7.
Figure 9:
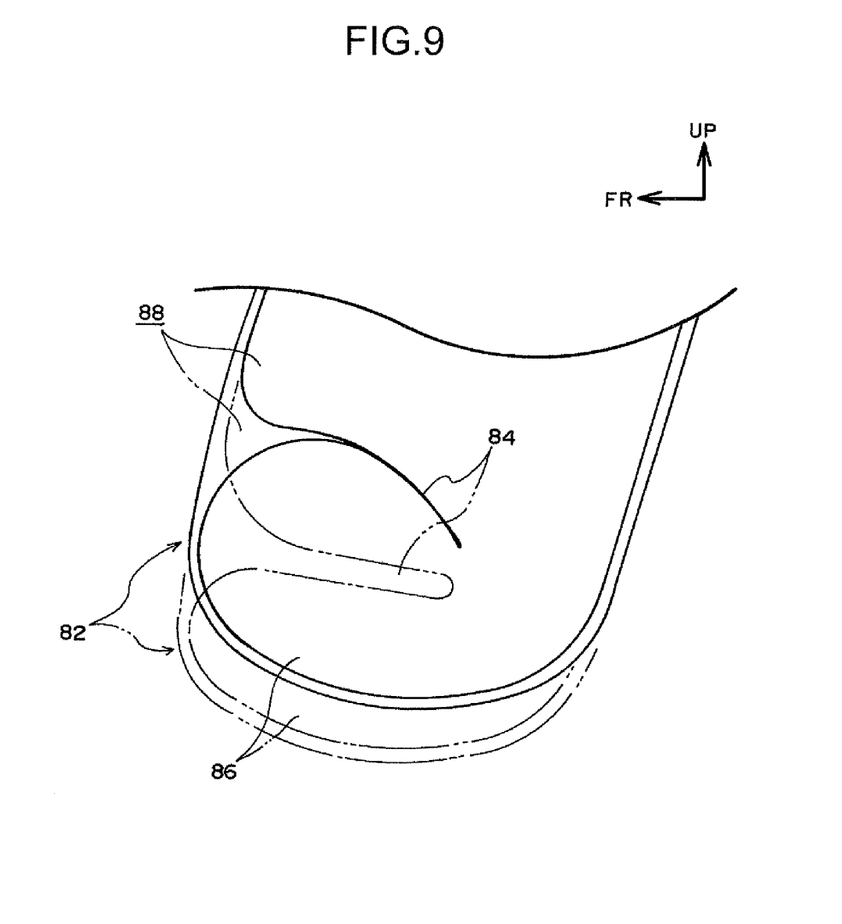
FIG. 9 is a magnified side view of principal portions, for describing a phenomenon of lifting up of a side airbag.

In a side airbag 82, as in a side airbag device 80 according to a comparative example shown in FIG. 7 to FIG. 9, gas flows from below to above in a lower chamber 86, which is described below. In this case too, the side airbag 82 acts to move toward the vehicle upper side (acts to lift up). This phenomenon is briefly described below. As shown in FIG. 7, a non-inflating portion 84 that extends in the vehicle front-and-rear direction is provided at a lower portion side of the side airbag 82. Thus, the internal cavity of the side airbag 82 is divided into the lower chamber 86 and an upper chamber 88, and a communication portion 92 that communicates between the lower chamber 86 and the upper chamber 88 is formed at a gas jetting unit 90 side of the side airbag 82. An aperture portion 98 of a diffuser 96 that covers an inflator 94 and regulates a flow of gas is provided at a lower end portion of the side airbag 82. Consequently, the gas that is jetted out from the inflator 94 disposed inside the diffuser 96 is jetted out downward into the lower chamber 86 of the side airbag 82. The gas circulates along a non-inflating portion 100, which is provided at the outer periphery side, and the non-inflating portion 84 that divides the interior of the side airbag 82 into upper and lower, and the gas flows through the communication portion 92 into the upper chamber 88. This flow of the gas is represented by arrow X and arrow Y in FIG. 7. When the gas flows in this manner, a force pushing up toward the vehicle upper side acts on the side airbag 82.

In the present exemplary embodiment as described above, during the expansion of the side airbag 22, the direction of flow of the gas is diverted toward the vehicle lower side while the lower chamber 56 is being inflated. Thus, a force pushing the side airbag 22 down toward the vehicle lower side is provided.

Thus, the side airbag device 18 according to the present exemplary embodiment may suppress or prevent lifting up of the side airbag 22 toward the vehicle upper side when there is a side collision.

In the present exemplary embodiment, rather than the non-inflating portion 84 as in the comparative example, the interior of the side airbag 22 is divided into the lower chamber 56 and the upper chamber 58 by the tether 46. Thus, respective bag widths of the lower chamber 56 and upper chamber 58 of the side airbag 22 may be assured. Consequently, tilting of the side airbag 22 in the vehicle width direction may be suppressed or prevented.

In the present exemplary embodiment, the height of the attachment portion 48 of the tether 46 to the vehicle body side base cloth portion 42 is specified to be lower than the height of the attachment portion 50 to the occupant side base cloth portion 38. Thus, the tether 46 is disposed as an inclined surface that is higher at the side closer to the occupant than at the side closer to the side door 40. Therefore, compared to a case in which the inclination direction is the opposite direction, a contact area S between the lower chamber 56, which has the higher internal pressure, and the thigh area of the occupant (see FIG. 2) is increased.

Furthermore, because the height of the attachment portion 48 of the tether 46 to the vehicle body side base cloth portion 42 is specified to be lower than the height of the armrest 54 that is integrally formed at the door trim 52, if the side door 40 intrudes to the vehicle cabin inner side when there is a side collision, a strong contact between the armrest 54 and the lower chamber 56 with the high internal pressure may be suppressed or avoided.

Therefore, the side airbag device 18 according to the present exemplary embodiment both may improve occupant pelvis area restraint performance and may moderate or eliminate a load on an occupant's pelvis area that is caused by the armrest 54 strongly pushing the lower chamber 56 with the high internal pressure.

In the present exemplary embodiment, the plural gas jetting holes 30 are formed in the protruding portion 28 that protrudes from the lower end portion of the inflator 24, and the gas is jetted out from the respective gas jetting holes 30. The inflator 24 is covered by the diffuser 26, and the gas jetting aperture 34 of the diffuser 26 is singly provided and disposed to be oriented toward the lower face 46B of the tether 46. Consequently, the gas that is jetted out from each of the plural gas jetting holes 30 of the inflator 24 is jetted out from the single gas jetting aperture 34 toward the lower face 46B of the tether 46. Thus, according to the side airbag device 18 in accordance with the present exemplary embodiment, the downward pushing force on the side airbag 22 may be adjusted by adjustment of the opening area or shape of the gas jetting aperture 34, the orientation of the gas jetting aperture 34 relative to the lower face 46B of the tether 46, or the like.

In the present exemplary embodiment, the gas that is jetted into the lower chamber 56 flows into the upper chamber 58 through the communication portion 60 that is disposed at the vehicle forward side relative to the center G (see FIG. 1) of the pelvis area of the occupant (more specifically, through the communication portion 60 between the front end portion 44A of the non-inflating portion 44 provided at the outer periphery of the side airbag 22 and the front end portion 46A of the tether 46). Consequently, unevenness of the lower chamber 56 of the side airbag 22 may be suppressed. Thus, according to the side airbag device 18 in accordance with the present exemplary embodiment, the side airbag 22 may be expanded in a consistent attitude.

In the descriptions hereabove, the side airbag device 18 for the front seat 10 is described, but this is not limiting. The present mode may also be applied to a side airbag device for a rear seat.

In the descriptions hereabove, the upper chamber 58 is provided so as to protect the torso area of an occupant, but this is not limiting. It is sufficient that the structure of the side airbag be capable of protecting at least the torso area of an occupant. Thus, for example, any large side airbag whose upper chamber is capable of protecting the torso area and shoulder area of an occupant or of protecting an occupant from the torso area to the head area is applicable.

In the descriptions hereabove, the height of the attachment portion 48 of the tether 46 to the vehicle body side base cloth portion 42 is specified to be lower than the height of the attachment portion 50 to the occupant side base cloth portion 38, but this is not limiting. Even in the reverse situation, the force pressing the side airbag 22 down toward the vehicle lower side can be provided.

The invention claimed is:

1. A side airbag device for an automobile, comprising:
   a side airbag stowed in a folded state, including:
      an occupant side base cloth portion disposed at an occupant side; and
      a vehicle body side base cloth portion disposed at a vehicle body side portion side,
   a tether that is disposed inside the side airbag, and of which a height of an attachment portion thereof to the vehicle body side base cloth portion is different from a height of an attachment portion thereof to the occupant side base cloth portion, the tether dividing a cavity inside the side airbag into a lower chamber and an upper chamber, and the upper chamber being in fluid communication with the lower chamber via a communication portion; and
   a gas jetting unit including:
      an inflator that, when operated, produces gas and jets out the gas through a plurality of gas jetting holes formed in a lower end portion thereof;
      a gas jetting aperture which is disposed in the lower chamber and is configured to jet the gas out toward a lower face of the tether when operated, such that a direction of flow of the gas is diverted toward a vehicle lower side while the lower chamber is being inflated, the gas jetting aperture being oriented toward the lower face of the tether; and
      a diffuser that (i) is formed in a tube shape of which one end is closed off, (ii) aperture is provided.

2. The side airbag device for an automobile according to claim 1, wherein
   the height of the attachment portion of the tether to the vehicle body side base cloth portion is lower than the height of the attachment portion to the occupant side base cloth portion, and
   the height of the attachment portion of the tether to the vehicle body side base cloth portion is specified to be lower than a height of a door armrest.

3. The side airbag device for an automobile according to claim 2, wherein a gap is formed between a front end portion of a non-inflating portion provided at an outer periphery of the side airbag and a front end portion of the tether, the gap serving as the communication portion.

4. The side airbag device for an automobile according to claim 1, wherein a gap is formed between a front end portion of a non-inflating portion provided at an outer periphery of the side airbag and a front end portion of the tether, the gap serving as the communication portion.

* * * * *